(12) United States Patent
Lin

(10) Patent No.: US 10,107,996 B2
(45) Date of Patent: Oct. 23, 2018

(54) WIDE-ANGLE PROJECTION OPTICAL SYSTEM

(71) Applicant: DELTA ELECTRONICS, INC., Taoyuan (TW)

(72) Inventor: Lai Chang Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 67 days.

(21) Appl. No.: 15/168,704

(22) Filed: May 31, 2016

(65) Prior Publication Data
US 2016/0274344 A1 Sep. 22, 2016

Related U.S. Application Data

(63) Continuation-in-part of application No. 14/167,782, filed on Jan. 29, 2014, now abandoned.

(30) Foreign Application Priority Data

Dec. 5, 2013 (TW) .............................. 102144713 A

(51) Int. Cl.
*G02B 17/08* (2006.01)
*G02B 13/16* (2006.01)
(Continued)

(52) U.S. Cl.
CPC ......... *G02B 17/0856* (2013.01); *G02B 13/04* (2013.01); *G02B 13/16* (2013.01);
(Continued)

(58) Field of Classification Search
CPC ................ G02B 13/16; G02B 17/0856; G02B 13/0065; G02B 13/007; G02B 13/04;
(Continued)

(56) References Cited

U.S. PATENT DOCUMENTS 6,473,243 B1 * 10/2002 Omura ............... G02B 17/0808
359/364
7,048,388 B2 5/2006 Takaura et al.
(Continued)

FOREIGN PATENT DOCUMENTS

CN 1667445 A 9/2005
CN 102782554 A 11/2012
(Continued)

*Primary Examiner* — Jordan Schwartz
(74) *Attorney, Agent, or Firm* — Kirton McConkie; Evan R. Witt

(57) ABSTRACT

A wide-angle projection optical system includes, between an object side and an image side, a first optical system including a first lens group having an aperture stop and a second lens group disposed behind the aperture stop, and a second optical system including a Mangin mirror and a glass plate disposed between the second lens group and the Mangin mirror. The first and second lens groups have positive power. The first lens group provides optical characteristics to match with a light coming from the object side. The first and second lens groups are configured to form an aberrated real image. The Mangin mirror is disposed closer to the image side than others. The Mangin mirror includes a refracting surface and a reflecting surface for refracting the light two times and reflecting the light one time, thereby producing an enlarged real image on a screen. Therefore, the image quality is enhanced.

17 Claims, 19 Drawing Sheets

(51) Int. Cl.
  *G02B 13/04* (2006.01)
  *G02B 27/00* (2006.01)
  *G03B 21/28* (2006.01)
  *G02B 13/18* (2006.01)
  *G02B 13/22* (2006.01)

(52) U.S. Cl.
  CPC ............. *G02B 13/18* (2013.01); *G02B 13/22* (2013.01); *G02B 27/0025* (2013.01); *G03B 21/28* (2013.01)

(58) Field of Classification Search
  CPC .... G02B 13/18; G02B 13/22; G02B 17/0808; G02B 17/0812; G02B 17/0824; G02B 17/0828; G02B 17/084; G02B 17/0844; G02B 27/0025; G03B 21/28
  USPC .................................................. 359/649–651
  See application file for complete search history.

(56) References Cited

U.S. PATENT DOCUMENTS

| | | | |
|---|---|---|---|
| 7,529,032 B2 | 5/2009 | Takaura et al. | |
| 2004/0156117 A1 | 8/2004 | Takaura et al. | |
| 2004/0212789 A1 | 10/2004 | Cha | |
| 2005/0200974 A1 | 9/2005 | Nishikawa et al. | |
| 2006/0082905 A1* | 4/2006 | Shafer | G02B 17/08 359/727 |
| 2007/0041104 A1 | 2/2007 | Togino | |
| 2007/0253076 A1 | 11/2007 | Takaura et al. | |
| 2008/0158523 A1 | 7/2008 | Jackson et al. | |
| 2011/0026111 A1 | 2/2011 | Nagatoshi | |
| 2011/0292515 A1 | 12/2011 | Kang et al. | |
| 2012/0120484 A1 | 5/2012 | Konuma et al. | |
| 2012/0327508 A1 | 12/2012 | Benoit et al. | |
| 2015/0160441 A1* | 6/2015 | Lin | G02B 13/16 359/649 |
| 2015/0226948 A1 | 8/2015 | Shafer et al. | |

FOREIGN PATENT DOCUMENTS

| | | | |
|---|---|---|---|
| FR | 2955673 | * | 7/2011 |
| JP | 2004258620 | | 9/2004 |
| JP | 2005292813 | | 10/2005 |
| JP | 2007127703 | | 5/2007 |
| JP | 2011033737 | | 2/2011 |
| JP | 2013015853 | | 1/2013 |

* cited by examiner

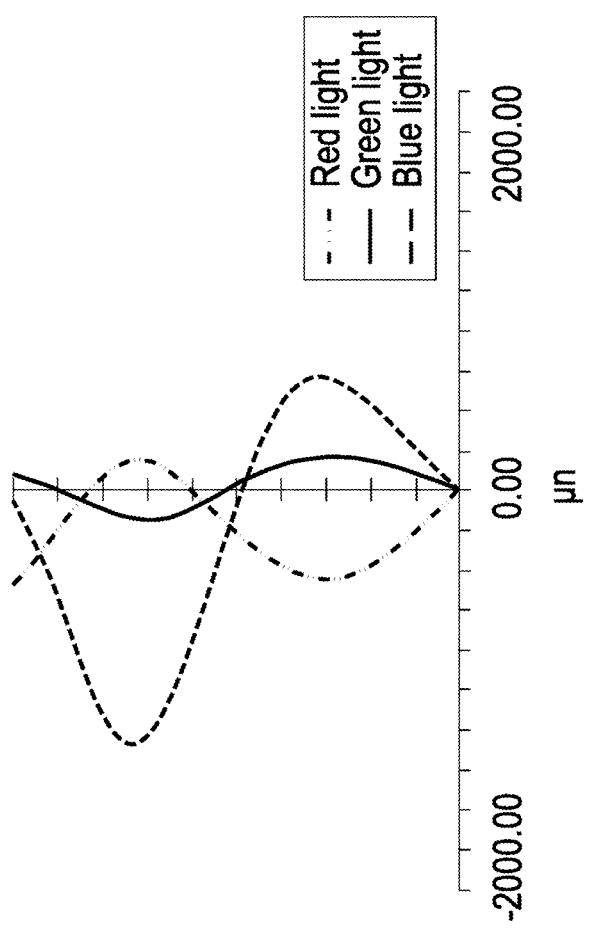

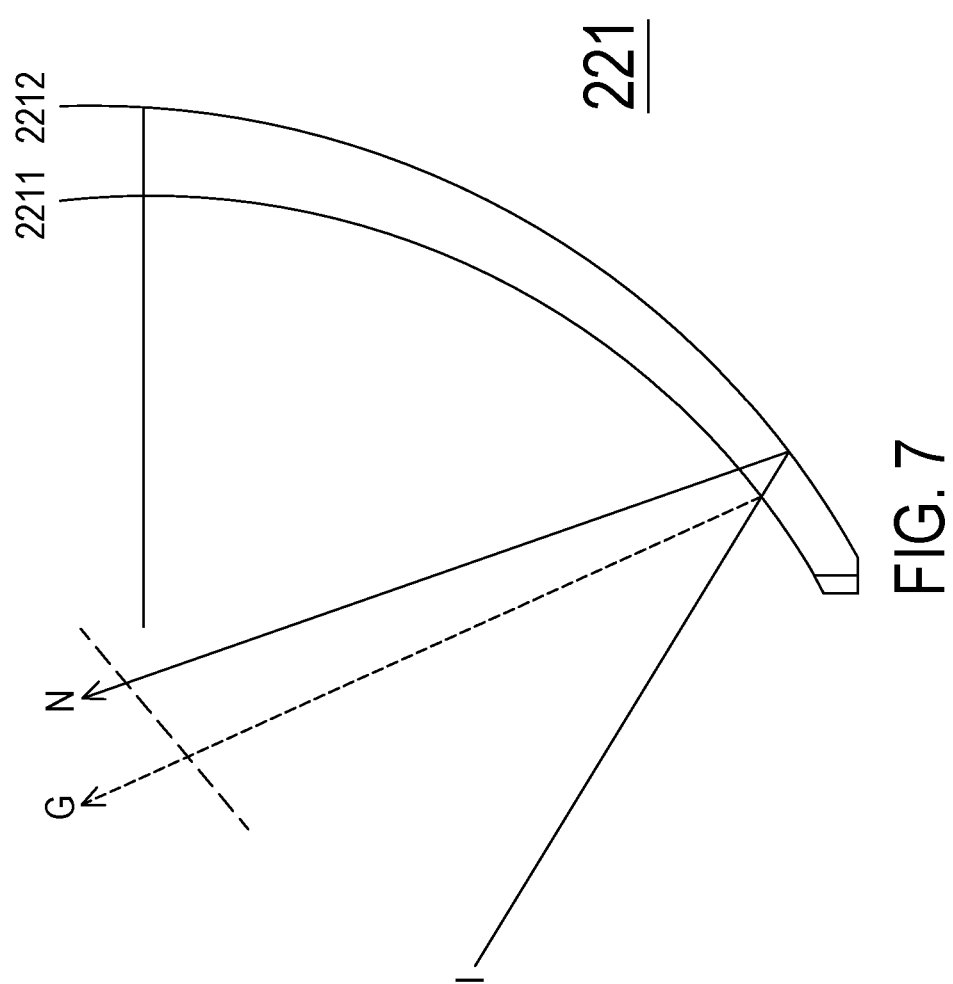

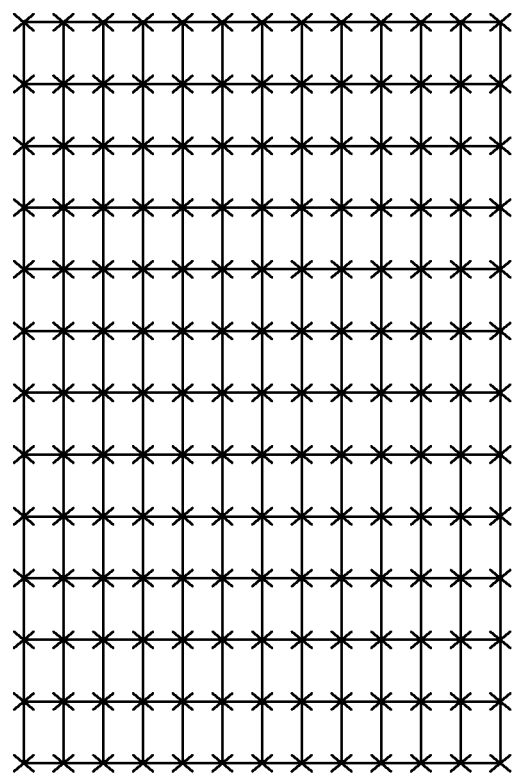

WIDE-ANGLE PROJECTION OPTICAL SYSTEM

CROSS-REFERENCE TO RELATED APPLICATION

This application is a continuation-in-part application of U.S. application Ser. No. 14/167,782 filed on Jan. 29, 2014, which claims the benefit of priority of Taiwan Application No. 102144713 filed on Dec. 5, 2013, the entirety of which is hereby incorporated by reference.

TECHNICAL FIELD

The present disclosure relates to a projection optical system, and more particularly to an ultra-short-throw or a wide-angle projection optical system.

BACKGROUND

A wide-angle projection lens has a large field of view, or a short effective focal length (EFL). In comparison with a conventional projection lens, the projection display apparatus with a wide-angle projection lens is capable of producing a certain sized image at a shorter distance.

Recently, an integrated system of a projection display apparatus and an interactive white board has become very useful tool in classrooms, lecture rooms or conference rooms in order to provide the interactive functions about education, demonstration or entertainment. FIG. 1A is a schematic diagram illustrating an integrated system of a projection display apparatus and an interactive white board according to the prior art. As shown in FIG. 1A, the projection display apparatus 10 is usually mounted upside down over the white board 11. The conventional short-throw projection display apparatus 10 is usually mounted at a distance of about 1 meter away from the white board 11. As such, the lecturer with average height becomes an obstacle to the light path of the projection display apparatus 10 when writing on the white board 11. In addition, the eyes of the lecturer have the potential danger of being illuminated by the light from the projection display apparatus 10.

For solving the above problems, as shown in FIG. 1B, the projection display apparatus 10 needs to be mounted in the vicinity of the white board 11. Since the projection distance is very short, the projection display apparatus 10 should have a wide-angle projection lens to provide a large full field angle θ or a very short focal length. In a case that the projection display apparatus 10 with a wide-angle projection lens is mounted over the white board 11, the light flux needs to incident on the white board 11 at a very steep angle, which incurs a large distortion in the image. Moreover, the projection lens also needs to have a large offset to avoid the light hitting on the main body of the projection display apparatus, and avoid the body of reflecting mirror blocking the top area of the white board. In other words, the wide-angle or ultra-short projection lens is very critical for designing the projection display apparatus.

U.S. Pat. No. 7,529,032 disclosed a wide-angle projection optical system. Please refer to FIG. 1C, which is a schematic diagram illustrating the configuration of a wide-angle projection optical system according to the prior art. As shown in FIG. 1C, the design uses two aspheric plastic lenses, one double concave negative lens and a negative aspheric reflecting mirror. The total length of the system is quite long. This makes it difficult to have a thin projector system. In addition, the maximum field angle is on the order of 55 degree, which still requires a fairly long projection distance to produce an image that is large enough for practical applications.

FIG. 1D is a schematic diagram illustrating the configuration of another wide-angle projection optical system according to the prior art. U.S. Pat. No. 7,048,388 disclosed a wide-angle projection lens design as shown in FIG. 1D that incorporates a flat mirror and a positive aspheric reflecting mirror. However, the optical components of the wide-angle projection optical system have to be tilted and decentered in arrangement for obtaining an undistorted image with better image quality. Otherwise, optical components having anamorphic polynomial free-form surfaces with different magnifications in vertical direction and horizontal direction are necessary to be used in the wide-angle projection optical system, and the complication of assembling or manufacturing optical components are increased.

There is a need of providing a wide-angle projection optical system to obviate the drawbacks encountered from the prior art.

BRIEF SUMMARY

It is an aspect of the present invention to provide a wide-angle projection optical system with short-throw in order to eliminate the drawbacks of dangers of a conventional optical system, distortions and aberrations.

An another aspect of the present invention provides a wide-angle projection optical system with ultra-short-throw having a large full field angle, which is for example larger than 70 degrees, a short effective focal length, thin profile, low distortion and aberration and high image quality.

An another aspect of the present invention provides a wide-angle projection optical system with a second optical system comprising a Mangin mirror and a glass plate. By the glass plate, a spatial filtering can be implemented to remedy the ghost image. More specifically, if the radius of curvatures of the refracting surface and the reflecting surface are sufficiently different, the light distributions of the lights reflected by the reflecting surface and the lights reflected by the refracting surface will be well-separated.

In accordance with an aspect of the present disclosure, there is provided a wide-angle projection optical system. The wide-angle projection optical system includes, between an object side and an image side, a first optical system including a first lens group having an aperture stop therein and a second lens group, and a second optical system including a Mangin mirror and a glass plate. The first lens group has positive power, and the second lens group has positive power. The aperture stop is located on the most image side of the first lens group. The first lens group provides optical characteristics to match with a light coming from the object side. The light is converged toward the aperture stop. The second lens group is disposed on the image side of (i.e. behind) the aperture stop. The first lens group and the second lens group are configured to form an aberrated real image in front of the Mangin mirror. The Mangin mirror is disposed closer to the image side than the first lens group, the aperture stop and the second lens group. The Mangin mirror includes a refracting surface and a reflecting surface for refracting the light two times and reflecting the light one time, thereby producing an enlarged real image on a screen. The glass plate is disposed between the second lens group and the Mangin mirror.

In accordance with another aspect of the present disclosure, there is provided a wide-angle projection optical system. The wide-angle projection optical system includes, from an object side to an image side, a first optical system including a first lens group having an aperture stop therein and a second lens group, and a second optical system including a refracting and reflecting mirror with positive power and a glass plate. The first lens group has positive power, and the second lens group has positive power. The aperture stop is located on the most image side of the first lens group. The first lens group provides optical characteristics to match with a light coming from the object side. The light is converged toward the aperture stop. The second lens group is disposed on the image side of (i.e. behind) the aperture stop, and both surfaces of at least one lens of the second lens group are aspheric. The first lens group and the second lens group are configured to form an aberrated real image in front of the refracting and reflecting mirror with positive power. The refracting and reflecting mirror includes a refracting surface and a reflecting surface for refracting the light two times and reflecting the light one time, thereby producing an enlarged real image on a screen. The glass plate is disposed between the second lens group and the refracting and reflecting mirror. The first lens group, the second lens group and the refracting and reflecting mirror have a common optical axis.

The above contents of the present disclosure will become more readily apparent to those ordinarily skilled in the art after reviewing the following detailed description and accompanying drawings, in which:

BRIEF DESCRIPTION OF THE DRAWINGS

FIG. 6 is a schematic diagram illustrating lateral color in the image side by the wide-angle projection optical system according to the embodiment of the present invention with the values shown in Table 1;

FIG. 7 is a schematic diagram illustrating the light reflected by the refracting surface due to Fresnel reflection and the light reflected by the reflecting surface of a Mangin mirror of the wide-angle projection optical system according to an embodiment of the present invention;

FIG. 13A is a schematic diagram illustrating grid distortion in the image side by the wide-angle projection optical system according to the embodiment of the present invention with the values shown in Table 3;

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1B:
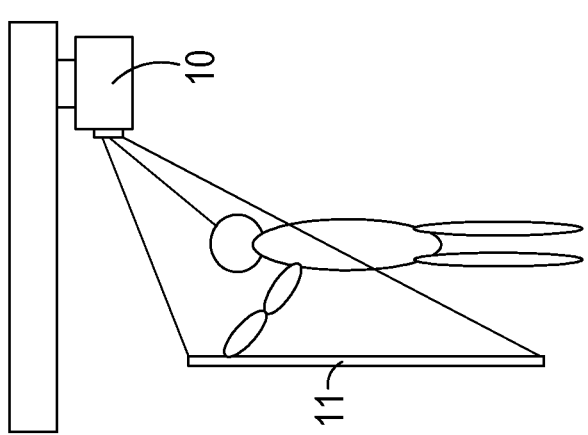
FIG. 1B is a schematic diagram illustrating an integrated system of a wide-angle projection display apparatus and an interactive white board according to the prior art.
Figure 1A:
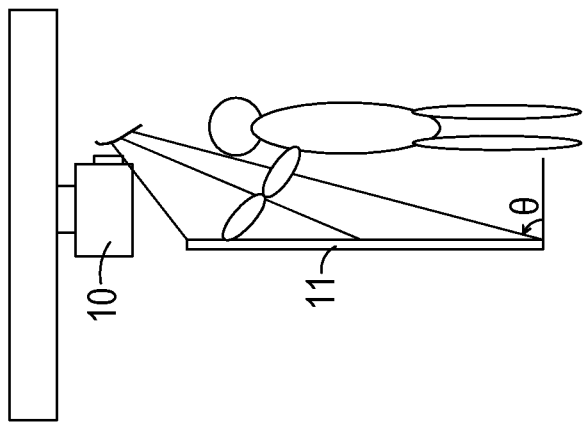
FIG. 1A is a schematic diagram illustrating an integrated system of a projection display apparatus and an interactive white board according to the prior art.
Figure 1C:
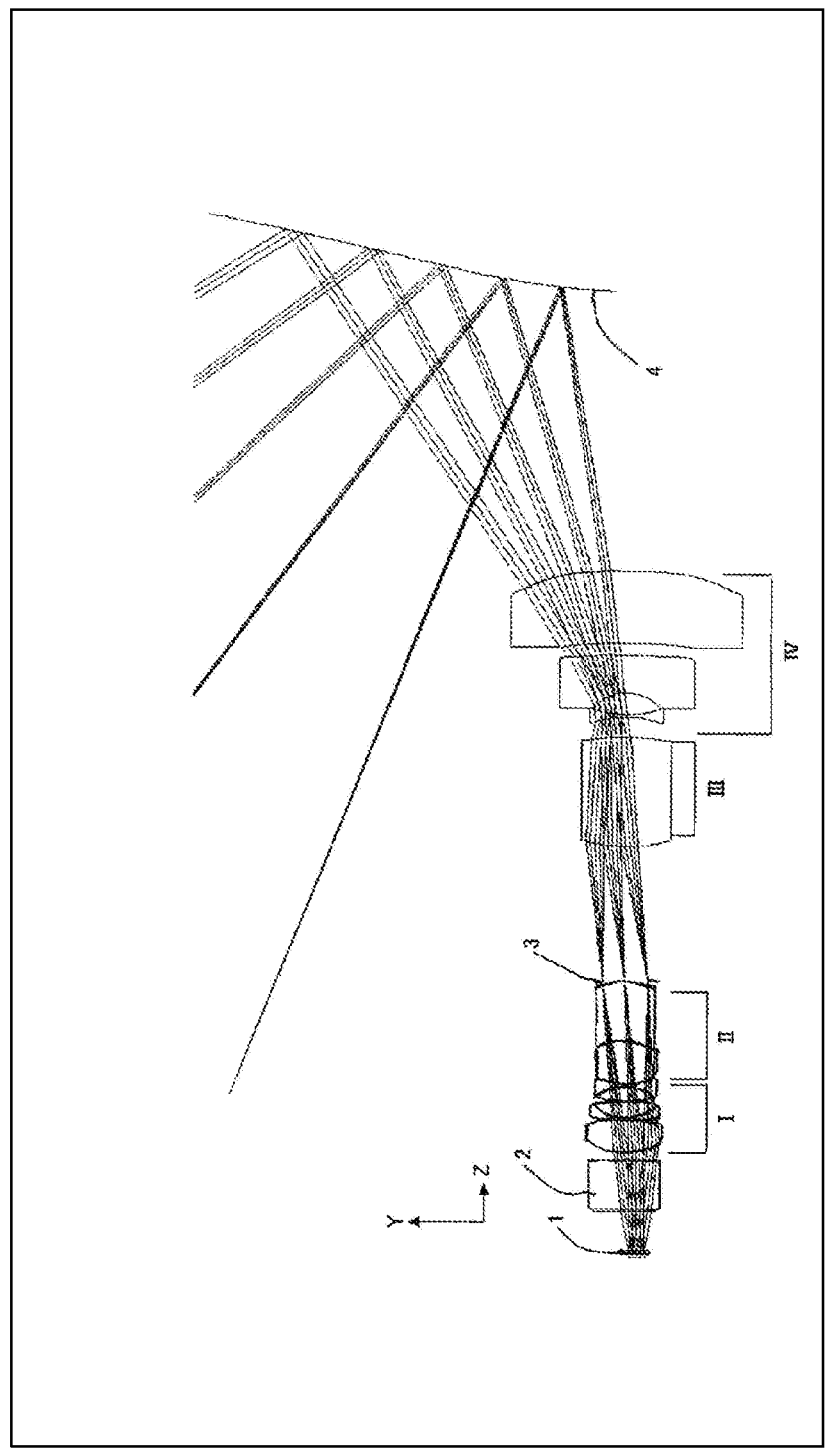
FIG. 1C is a schematic diagram illustrating the configuration of a wide-angle projection optical system according to the prior art.
Figure 1D:
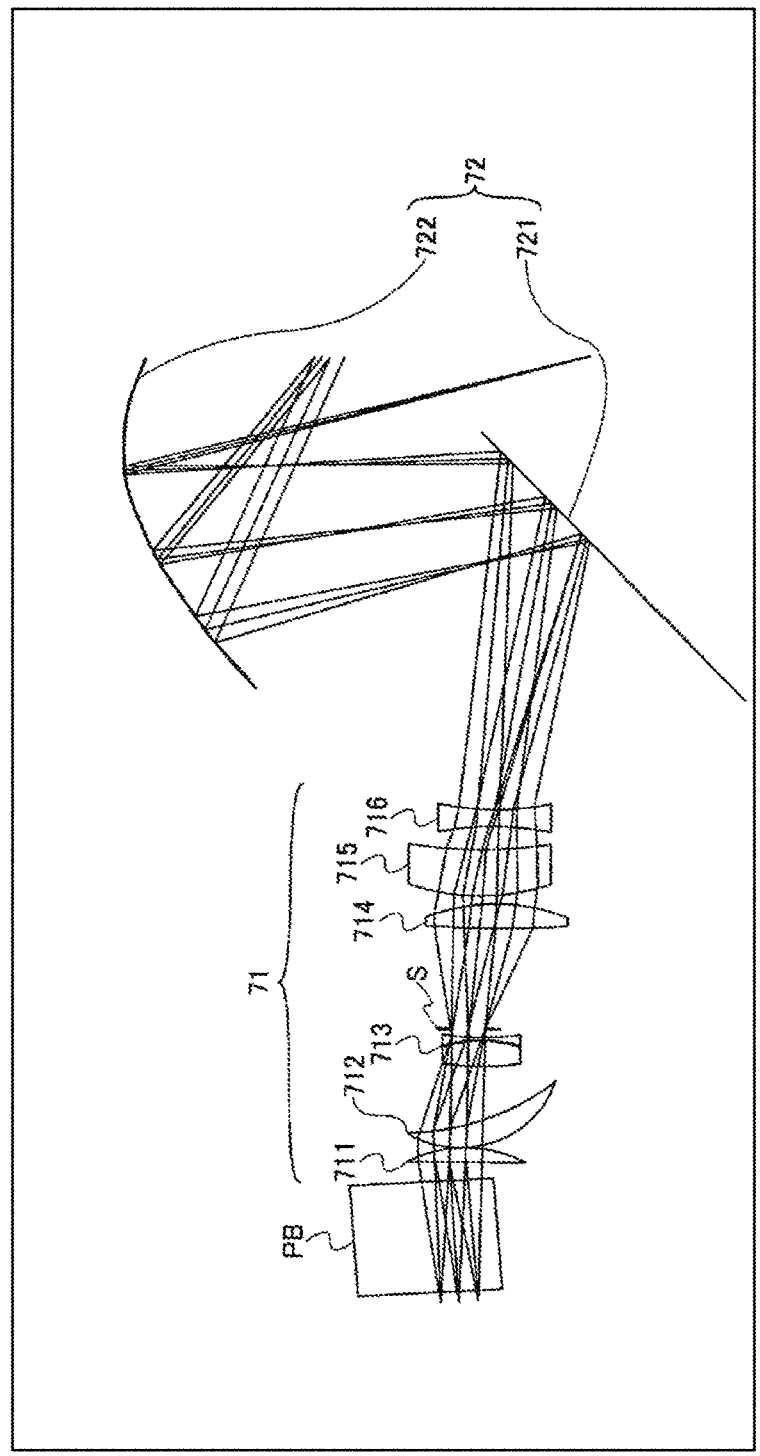
FIG. 1D is a schematic diagram illustrating the configuration of another wide-angle projection optical system according to the prior art.
Figure 2:
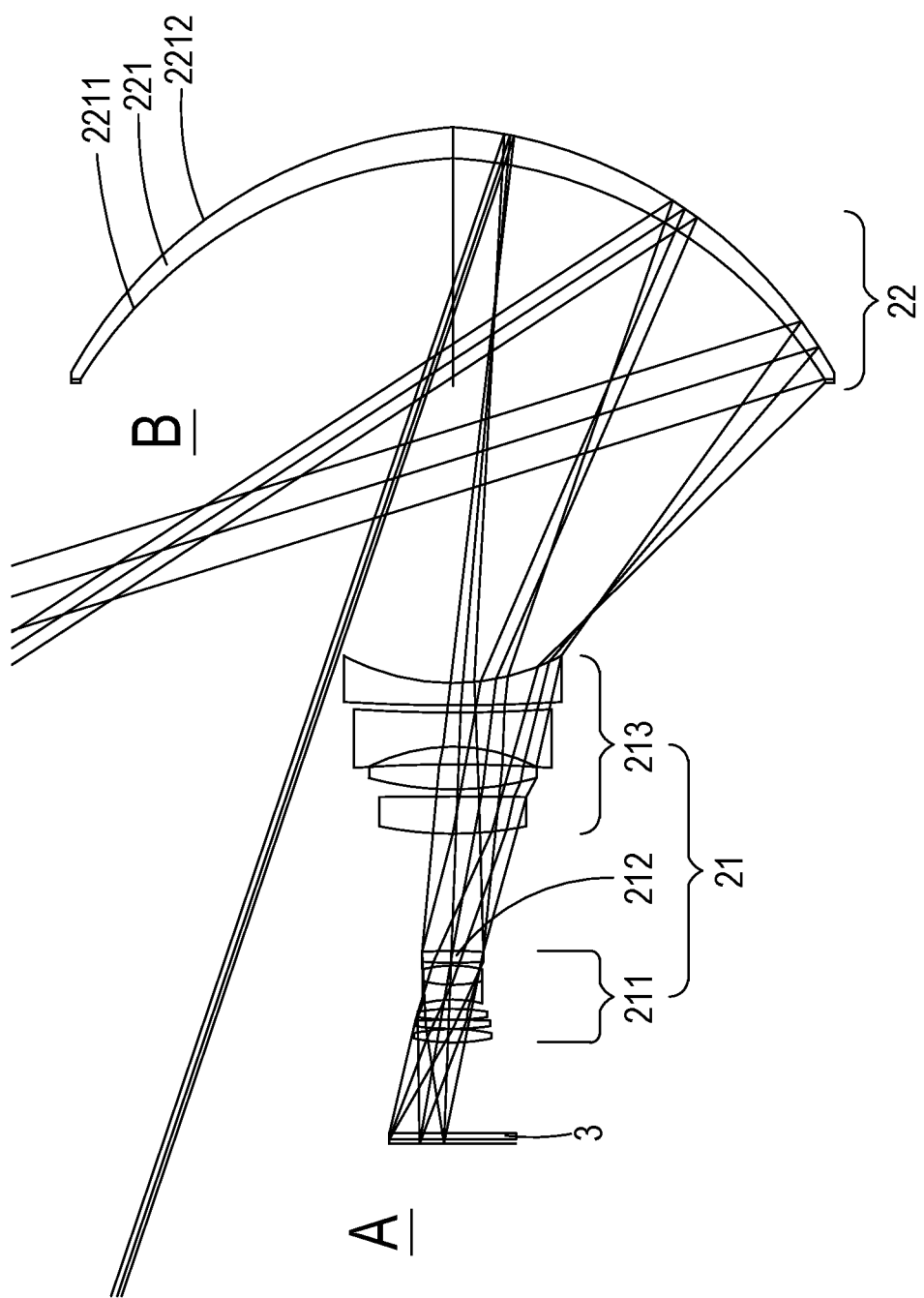
FIG. 2 is a schematic diagram illustrating the configuration of a wide-angle projection optical system according to an embodiment of the present invention.

Please refer to FIG. 2. FIG. 2 is a schematic diagram illustrating the configuration of a wide-angle projection optical system according to an embodiment of the present invention. As shown in FIG. 2, the wide-angle projection optical system 2 is a non-telecentric projection optical system, which can be applied to a projection display apparatus. The projection display apparatus includes, but not limited to, a digital micromirror device (hereinafter "DMD"). The DMD has an object surface 3, which is an image-displaying surface of a light valve. The object surface 3 is configured as an object side A for the image projected by the wide-angle projection optical system 2 of the present invention to be formed on. In this embodiment, the wide-angle projection optical system 2 includes, between the object side A and an image side B, a first optical system 21 and a second optical system 22, among which the first optical system 21 and the second optical system 22 are configured to form the wide-angle projection optical system 2 as a non-telecentric wide-angle projection optical system. The first optical system 21 includes a first lens group 211 having positive power and including a aperture stop 212 and a second lens group 213 having positive power, and the second optical system 22 includes a Mangin mirror 221. The first lens group 211 sets up proper working space and pupil position to match with optical characteristics of a light coming from an illumination optical system (i.e. the object side). In other words, the first lens group 211 is configured to provide optical characteristics to match with a light coming from the object side A and converge the light toward the aperture stop 212, such that the light is further projected or outputted to the second lens group 213.

In particular, the first lens group 211 of the wide-angle projection optical system 2 consists of a plurality of refraction lenses and has positive effective optical power for providing the telecentricity of object space and converging the light emitted toward the aperture stop 212 by the DMD. In this embodiment, the aperture stop 212 is located in the first lens group 211 and at the focus point of the main light. Moreover, the Mangin mirror 221 is disposed closer to the image side B than the first lens group 211, the aperture stop 212 and the second lens group 213. An aberrated real image is formed by the first lens group 211 and the second lens group 213. The Mangin mirror 221 includes a refracting surface 2211 and a reflecting surface 2212 for refracting the light two times and reflecting the light one time, thereby producing an enlarged real image on a screen in order to correct aberration and distortion. Therefore, the full field angle is enhanced, and the projection lens or the body of the projection display apparatus can be located between the reflecting mirror and the screen, thereby miniaturizing the integrated projection system.

In some embodiments, the Mangin mirror 221 is a concave Mangin mirror having positive power, and the center of curvature of the Mangin mirror is disposed between the object side A and the image side B.

The first lens group 211, the aperture stop 212 and the second lens group 213 of the first optical system 21 and the Mangin mirror 221 of the second optical system 22 of the wide-angle projection optical system 2 of one embodiment of the present invention are arranged sequentially from the object side A to the image side B, but are not limited thereto. Every lens of the first lens group 211 and the second lens group 213 and the Mangin mirror 221 have a common optical axis. In addition, the exteriors of each lens of the first lens group 211 and each lens of the second lens group 213 of the first optical system 21 and the Mangin mirror 221 of the second optical system 22 are axially symmetric relative to the common optical axis.

In this embodiment, the surfaces of each lens of the first lens group 211 are spherical, but aspheric surfaces also can be used to further reduce the aberration and distortion of the final image in other embodiments. That is, both surfaces of each lens of the first lens group 211 (e.g. the front surface and the rear surface) are either spherical or aspheric. Furthermore, at least one lens of the second lens group 213 is an aspheric lens. Both surfaces, namely the front surface and the rear surface, of at least one lens of the second lens group 213 are aspheric in order to correct aberration and distortion. In each embodiment of the present invention, the effective optical power is properly distributed among the lenses of the first lens group 211 and/or the second lens group 213 in order to lower the sensitivity to mechanical tolerances.

Figure 3:
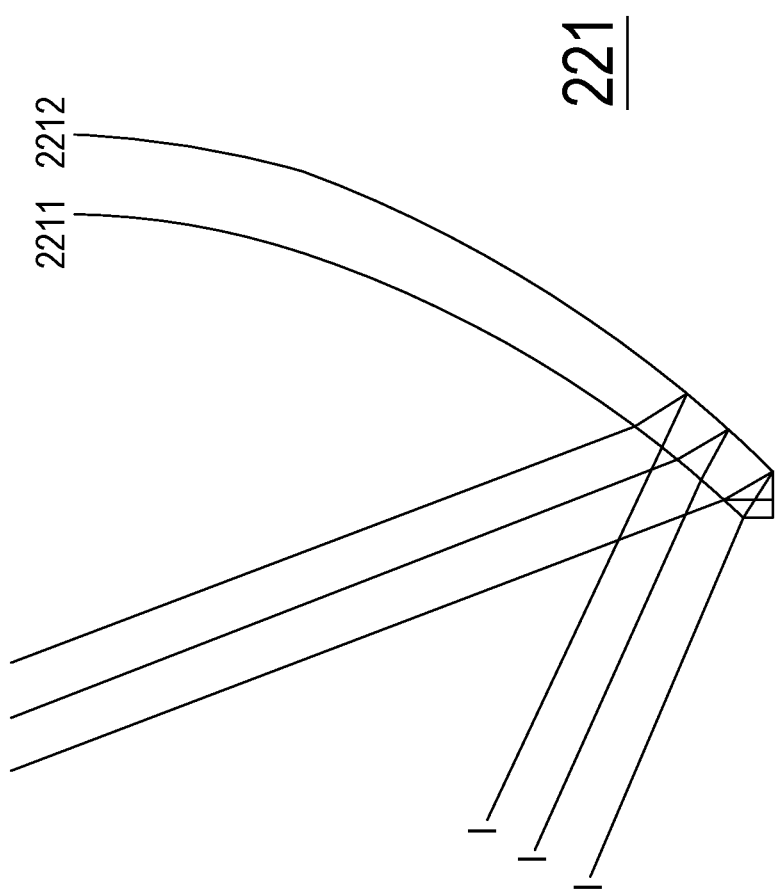
FIG. 3 is a schematic diagram illustrating the detailed structure of a Mangin mirror of the wide-angle projection optical system according to an embodiment of the present invention.

Please refer to FIG. 2 and FIG. 3. FIG. 3 is a schematic diagram illustrating the detailed structure of a Mangin mirror of the wide-angle projection optical system according to an embodiment of the present invention. As shown in FIG. 2 and FIG. 3, the Mangin mirror 221 of the second optical system 22 of the wide-angle projection optical system 2 has positive power, and the Mangin mirror is preferably a refracting and reflecting mirror and not limited to a meniscus lens coated with an anti-reflecting coating (ARC). In some preferable embodiments, the light I projected or emitted through the object side A, the first lens group 211, the aperture stop 212 and the second lens group 213 is transmitted through the refracting surface 2211 of the Mangin mirror 221 from the air, reflected by the reflecting surface 2212, and further transmitted through the refracting surface 2211 in a reverse direction, so the two refractions and the one reflection are implemented. In brief, regarding the optical path of the two refractions and the one reflection of the light I, it can be considered as transmitting through three mediums. Compared with the conventional reflecting mirror applied in the prior art, the design factor and design parameter are added in the present invention, so that the optical system can be easily designed and adjusted for reducing the image distortion and the image aberration. Moreover, by utilizing the refracting surface 2211 and the reflecting surface 2212 of the Mangin mirror 221, the anamorphic polynomial free-form surfaces are not necessary in design of the wide-angle projection optical system 2 of the present disclosure. That is, none of any non-axially symmetric optical component is used in the present invention, so that the manufacturing difficulty is reduced, and tight tolerances are avoided.

Table 1 shows the prescription data of the lenses. In Table 1, "No." is a surface number from the object side to the image side. "R" indicates radius of curvature, "T" indicates the thickness, "Nd" indicates a refractive index, and "Vd" indicates an Abbe number. The front and rear surfaces of the lenses No. 13, No. 14, No. 19, No. 20, No. 21, and No. 22 are all aspheric. The aspheric coefficients (k, A4, A6, A8, A10 and A12) of these surfaces are listed in Table 2. As a consequence, wide-angle projection optical system 2 of the present invention can achieve a full field angle larger than ±70 degrees. In this embodiment the micro-display is illuminated by a non-telecentric illumination system. This means that the central rays from each filed on the micro-display are essentially concentrated toward a point at a finite distance from the micro-display. The surface figure of the aspheric surface is described by the following equation.

$$Z(r) = \frac{Cr^2}{1 + \sqrt{1 - (1+k)C^2 r^2}} + A_2 r^2 + A_4 r^4 + A_6 r^6 + A_8 r^8 + A_{10} r^{10} + A_{12} r^{12}$$

In this equation, Z(r) indicates the bending amount (sag) of a surface, C=1/R, and r indicates the distance between a surface and the optical axis.

TABLE 1

| No. | R | T | Nd | Vd |
|---|---|---|---|---|
| 0 | Infinity | 0.7 | | |
| 1 | Infinity | 1.050 | 1.51 | 63.0 |
| 2 | Infinity | 19.936 | | |
| 3 | −1421.486 | 2.614 | 1.50 | 81.5 |

TABLE 1-continued

| No. | R | T | Nd | Vd |
|---|---|---|---|---|
| 4 | −29.764 | 0.15 | | |
| 5 | 410.168 | 2.306 | 1.60 | 65.4 |
| 6 | −47.968 | 2.954 | | |
| 7 | −20.458 | 1.000 | 1.67 | 33.0 |
| 8 | 21.148 | 3.286 | 1.5 | 81.5 |
| 9 | −29.890 | 0.960 | | |
| 10 | Infinity | 0.361 | | |
| 11 | 42.326 | 2.935 | 1.67 | 48.3 |
| 12 | −31.694 | 23.320 | | |
| 13 | 72.172 | 6.589 | 1.53 | 56.0 |
| 14 | −1692.620 | 1.439 | | |
| 15 | 56.672 | 5.066 | 1.65 | 39.7 |
| 16 | −138.685 | 3.492 | | |
| 17 | −33.126 | 6.706 | 1.60 | 65.4 |
| 18 | 196.555 | 1.561 | | |
| 19 | −89.079 | 4.505 | 1.53 | 56 |
| 20 | 32.955 | 103.683 | | |
| 21 | −86.710 | 6.923 | 1.53 | 56 |
| 22 | −62.982 | −6.923 | −1 | 0 |
| 23 | −86.710 | | −613.116 | |
| 24 | Infinity | | | |

TABLE 2

| No. | k | A4 | A6 | A8 | A10 | A12 |
|---|---|---|---|---|---|---|
| 13 | −8.826 | −1.334e−5 | −2.443e−8 | −5.594e−11 | −3.515e−13 | 3.856e−16 |
| 14 | 3.09e+05 | 4.526e−6 | 2.188e−8 | −7.790e−11 | 1.208e−14 | 1.016e−15 |
| 19 | −50.607 | 8.271e−6 | 9.983e−9 | 3.272e−11 | −6.168e−13 | 1.723e−17 |
| 20 | −4.391 | −3.152e−6 | 2.616e−9 | 2.269e−12 | 8.648e−15 | 5.275e−18 |
| 21 | −1.877 | −8.721e−7 | 2.383e−11 | 9.764e−15 | −1.020e−18 | 2.334e−23 |
| 22 | −2.965 | −8.610e−7 | 5.423e−11 | −5.071e−16 | −3.133e−19 | 5.454e−24 |
| 23 | −1.877 | −8.721e−7 | 2.383e−11 | 9.764e−15 | −1.020e−18 | 2.334e−23 |

Figure 4:
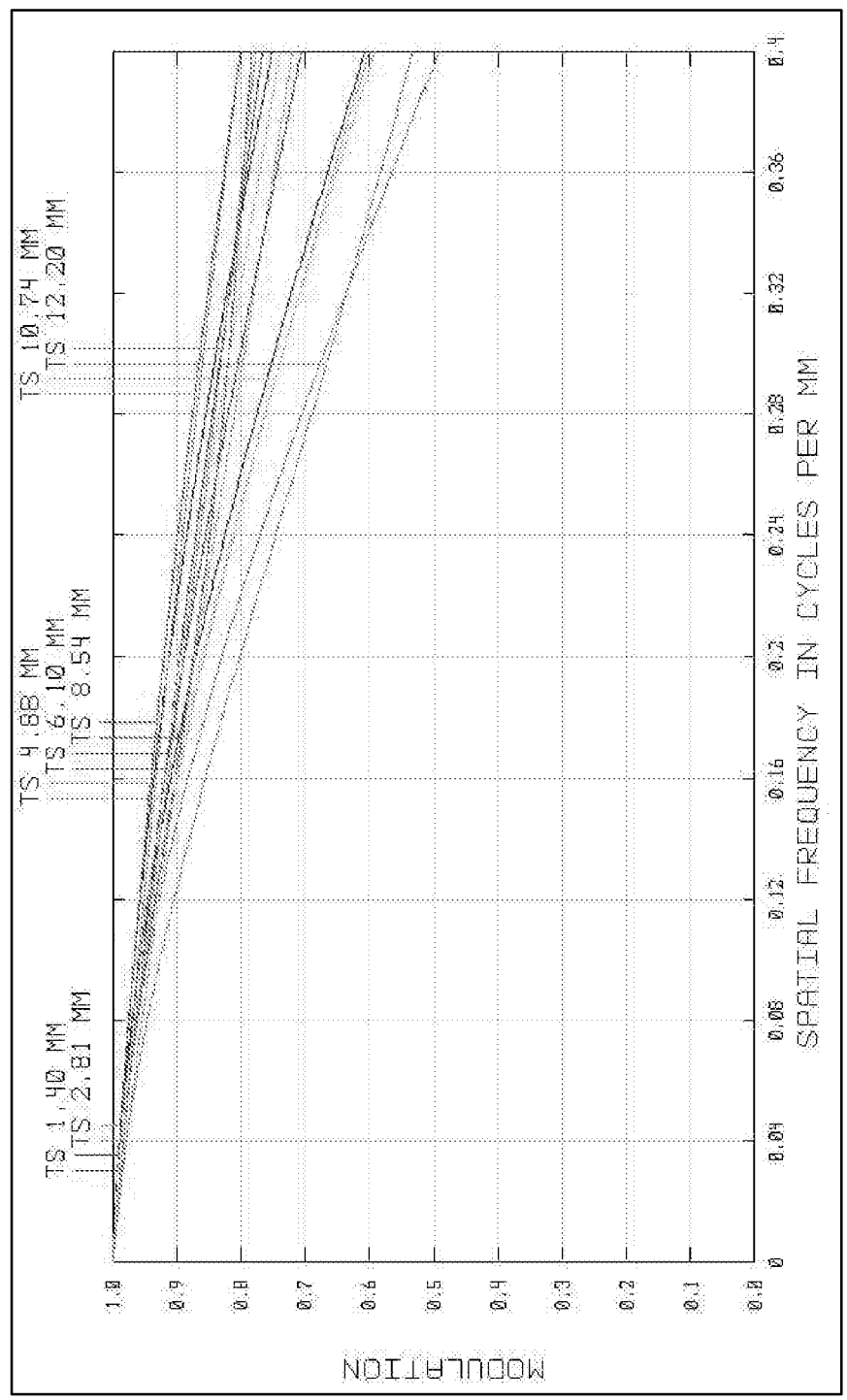
FIG. 4 is a schematic diagram illustrating modulation transfer function (MTF) characteristics in the image side by the wide-angle projection optical system according to the embodiment of the present invention with the values shown in Table 1.
Figure 5A:
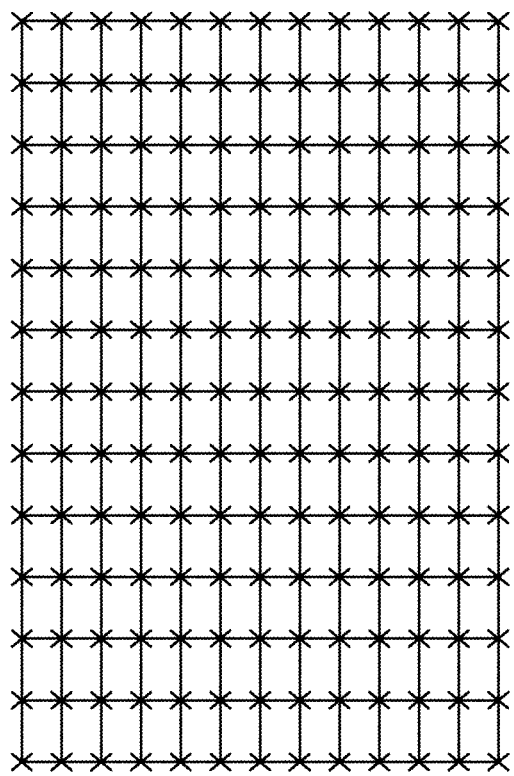
FIG. 5A is a schematic diagram illustrating grid distortion in the image side by the wide-angle projection optical system according to the embodiment of the present invention with the values shown in Table 1.
Figure 5B:
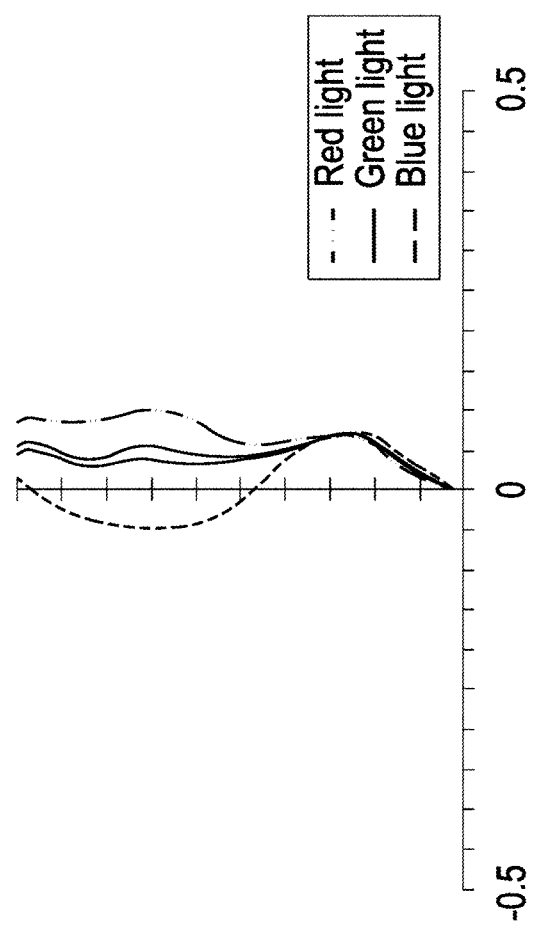
FIG. 5B is a schematic diagram illustrating distortion curve in the image side by the wide-angle projection optical system according to the embodiment of the present invention with the values shown in Table 1.

FIG. 4 is a schematic diagram illustrating modulation transfer function (MTF) characteristics in the image side by the wide-angle projection optical system according to the embodiment of the present invention with the values shown in Table 1. The horizontal axis indicates spatial frequency (cycles/mm) and the vertical axis of ordinates indicates modulation values. The spatial frequency indicates the number of sine waves per millimeter. The maximum value 1 in the vertical axis indicates that the MTF is 100%. As shown in FIG. 4, in the Nyquist Frequency, the MTF is still greater than 50%, which means the MTF ratio does not obviously decrease, so that every pixel is clearly resolved in achieving high quality image. FIG. 5A is a schematic diagram illustrating grid distortion in the image side by the wide-angle projection optical system according to the embodiment of the present invention with the values shown in Table 1. FIG. 5B is a schematic diagram illustrating distortion curve in the image side by the wide-angle projection optical system according to the embodiment of the present invention with the values shown in Table 1. As shown in FIG. 5A and FIG. 5B, the grid distortion or image distortion can be effectively corrected in the projection areas of the embodiment. FIG. 6 is a schematic diagram illustrating lateral color in the image side by the wide-angle projection optical system according to the embodiment of the present invention with the values shown in Table 1. As shown in FIG. 6, the difference of the lateral colors is less than a pixel, so that the color dislocation issue is avoided when projecting color lights, which means the chromatic aberration is also effectively corrected by the present invention. From the above drawings, the wide-angle projection optical system 2 of the present invention has a large full field angle, low image aberration or distortion, good optical characteristics and high image quality. A projection with high image quality and low image distortion is implemented by the embodiments mentioned above without any non-axially symmetric optical component.

In some embodiments, there is one negative aspect of using Mangin mirror. Please refer to FIG. 7. FIG. 7 is a schematic diagram illustrating the light reflected by the refracting surface due to Fresnel reflection and the light reflected by the reflecting surface of a Mangin mirror of the wide-angle projection optical system according to an embodiment of the present invention. When refracting at the refracting surface 2211 of the Mangin mirror 221, a small amount of the light I will be reflected as the extraneous light G by the refracting surface 2211 due to Fresnel reflection, even though the refracting surface 2211 is usually anti-reflection coated. The extraneous light G is shown as dotted line in FIG. 7. The extraneous light G will travel at angles close to the light N reflected by the reflecting surface 2212 and form a defocused image on the screen. This type of artifact is usually called "ghost image".

Figure 8:
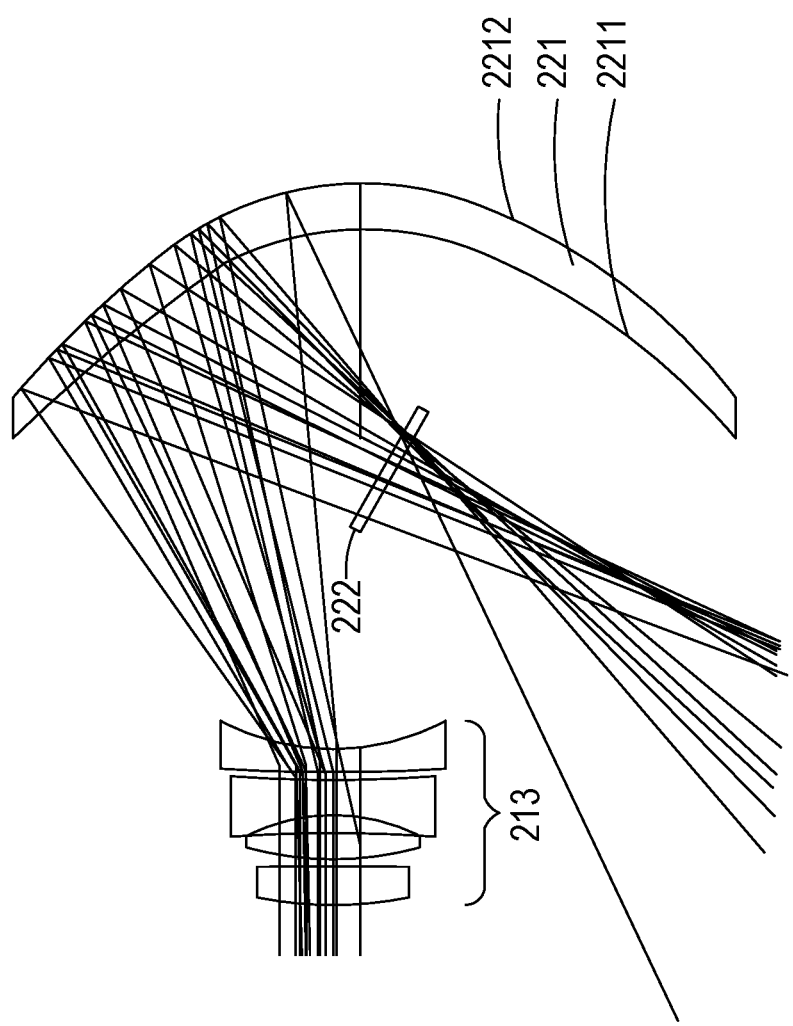
FIG. 8 is a schematic diagram illustrating the detailed configuration of the second optical system comprising a glass plate according to an embodiment of the present invention.
Figure 9A:
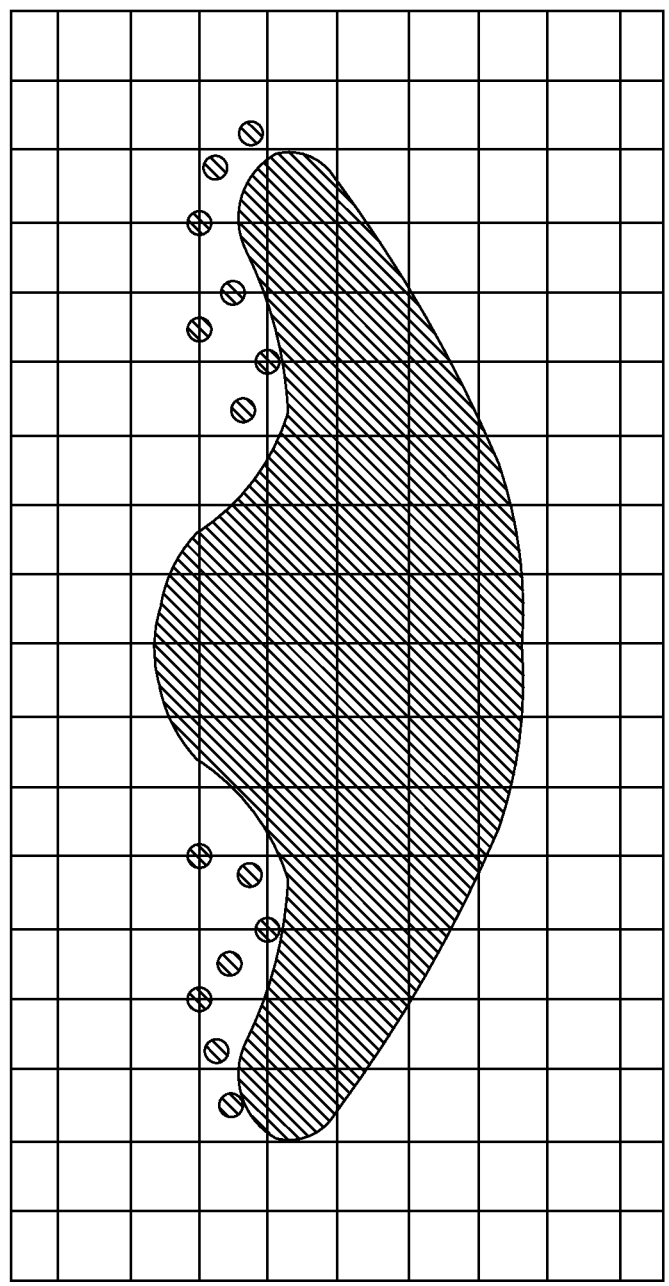
FIG. 9A is a schematic diagram illustrating a light distribution diagram of the lights reflected by the reflecting surface of the Mangin mirror.
Figure 9B:
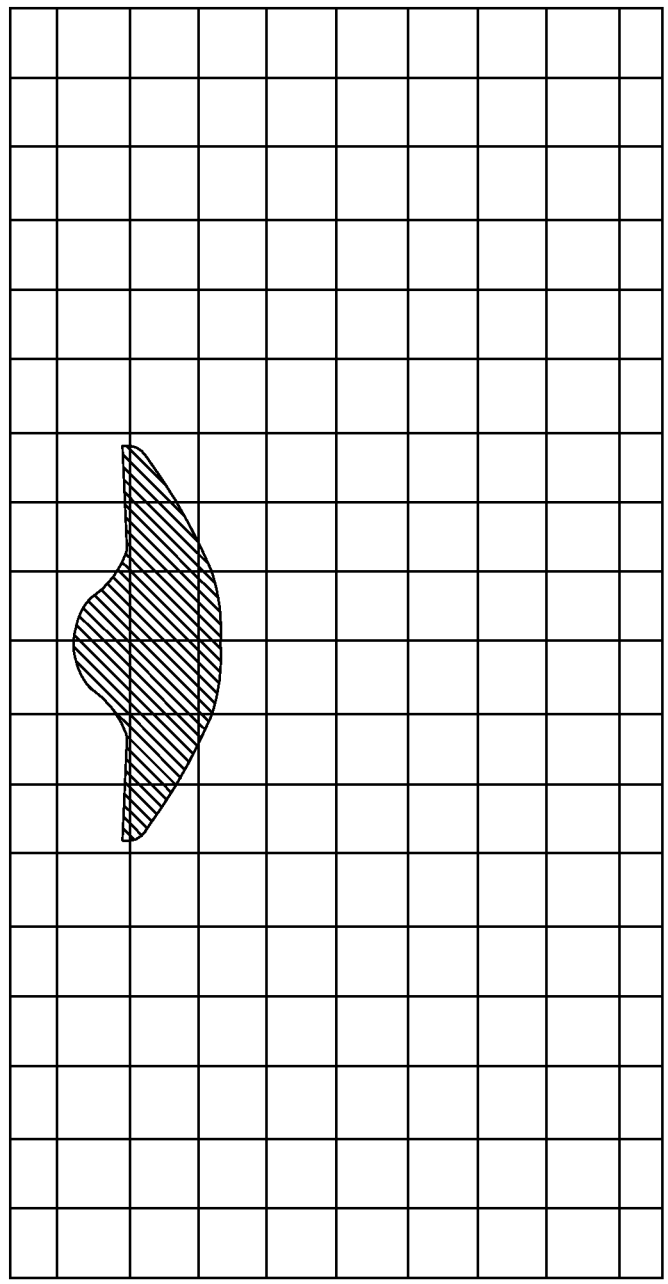
FIG. 9B is a schematic diagram illustrating a light distribution diagram of the lights reflected by the refracting surface of the Mangin mirror due to Fresnel reflection.
Figure 10:
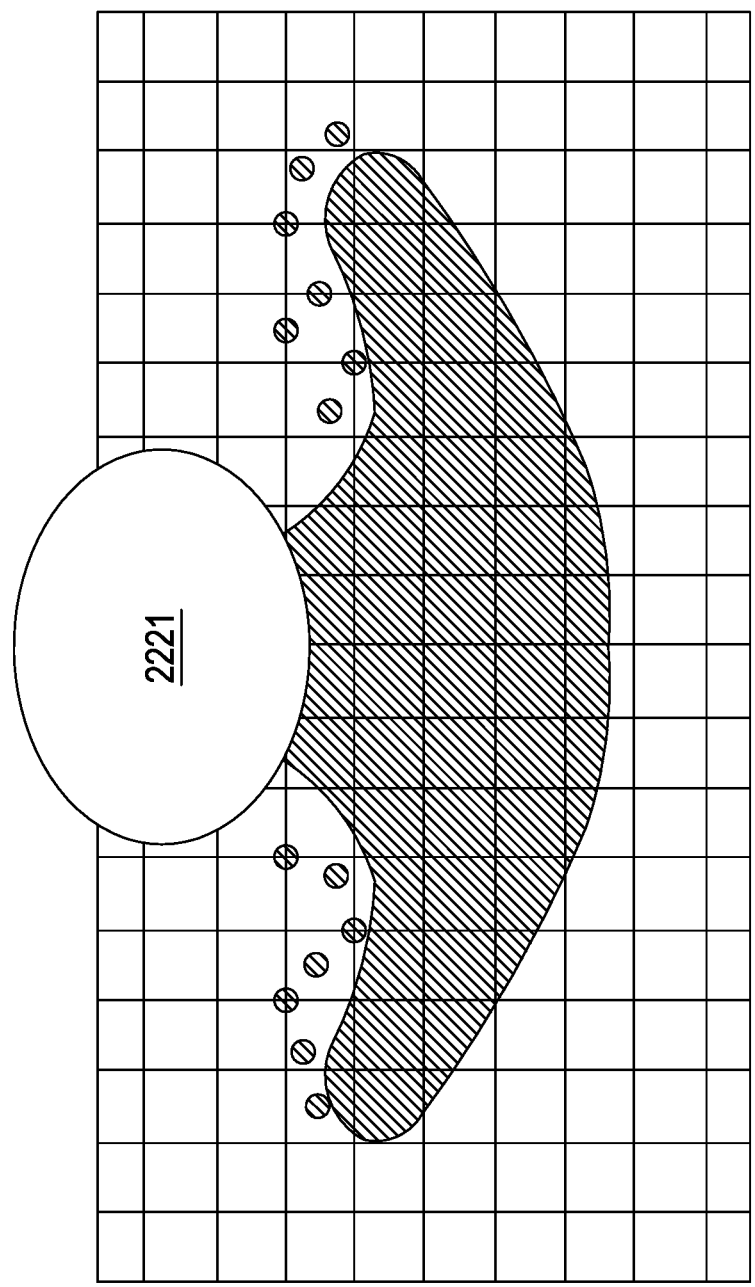
FIG. 10 is a schematic diagram illustrating a light distribution diagram of the lights reflected by the reflecting surface of the Mangin mirror and the light filtered by a black aperture placed on the glass plate of the second optical system.

One way to remedy the ghost image is spatial filtering. Please refer to FIG. 2 and FIGS. 8-10. FIG. 8 is a schematic diagram illustrating the detailed configuration of the second optical system comprising a glass plate according to an embodiment of the present invention. FIG. 9A is a schematic diagram illustrating a light distribution diagram of the lights reflected by the reflecting surface of the Mangin mirror. FIG. 9B is a schematic diagram illustrating a light distribution diagram of the lights reflected by the refracting surface of the Mangin mirror due to Fresnel reflection. FIG. 10 is a schematic diagram illustrating a light distribution diagram of the lights reflected by the reflecting surface of the Mangin mirror and the light filtered by a black aperture placed on the glass plate of the second optical system.

As shown in FIG. 2 and FIG. 8, the second optical system 22 further comprises a glass plate 222. The glass plate 222 is disposed between the second lens group 213 and the Mangin mirror 221, and particularly at a location where the lights reflected by the reflecting surface 2212 are most concentrated. If the radius of curvatures of the refracting surface 2211 and the reflecting surface 2212 are sufficiently different, the light distributions of the lights reflected by the reflecting surface 2212 and the lights reflected by the refracting surface 2211 (i.e. the extraneous lights) will be well-separated. A black aperture 2221 can be disposed on the glass plate 222 to filter out the extraneous lights and thus eliminate the ghost image as shown in FIG. 10.

As mentioned above, in order for the spatial filtering technique to be effective in eliminating ghost image, the radius of curvatures of the refracting surface 2211 and the reflecting surface 2212 need to be sufficiently different. It is preferable that the curvatures meet the following condition: Absolute value of (R1−R2)/Absolute value of (R1+R2) >0.12, which can be written by $|R1-R2|/|R1+R2|>0.12$, in which R1 is the radius of curvature of the refracting surface 2211 and R2 is the radius of curvature of the reflecting surface 2212 of the Mangin mirror 221.

Figure 11:
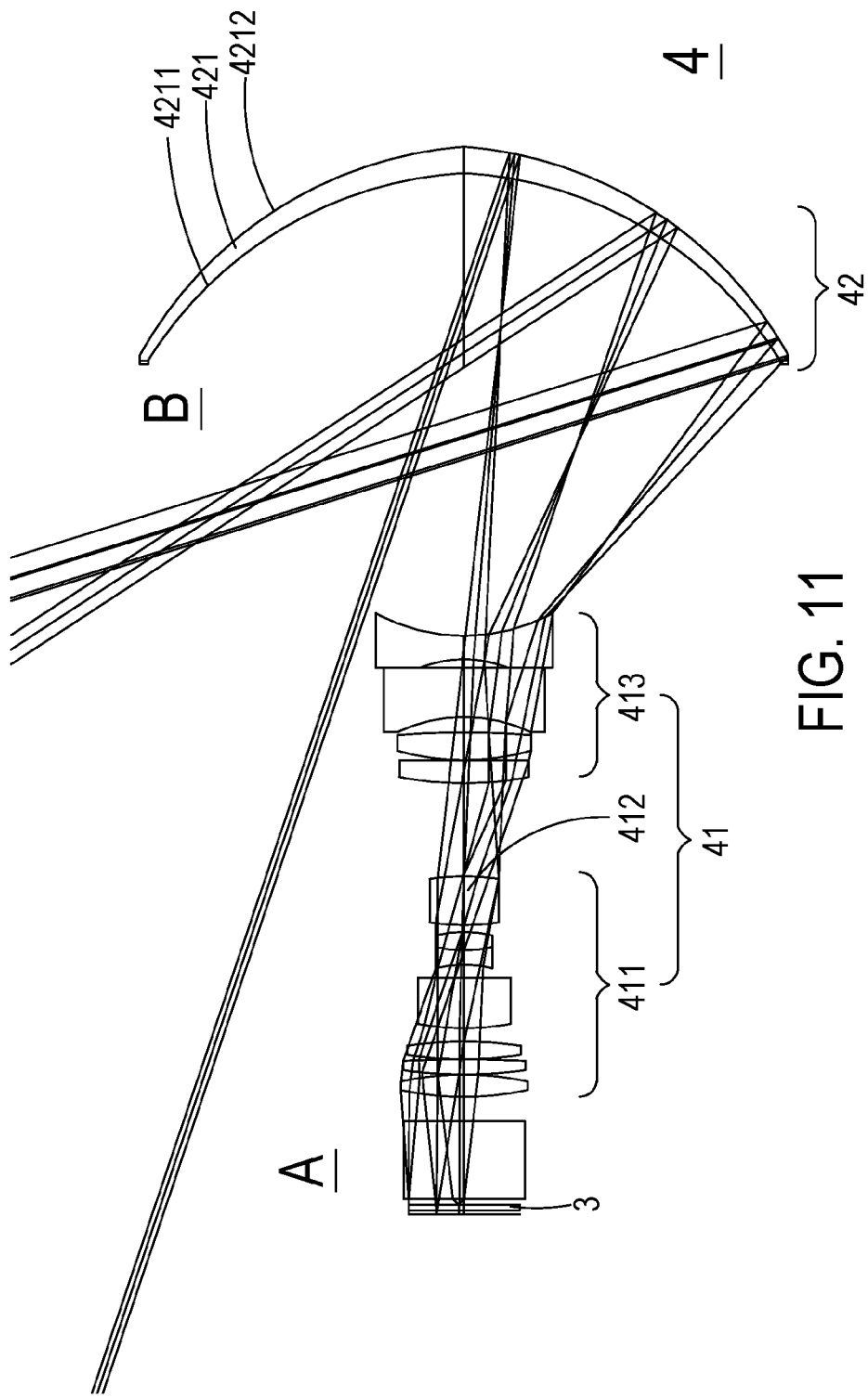
FIG. 11 is a schematic diagram illustrating the configuration of a wide-angle projection optical system according to another embodiment of the present invention.

Please refer to FIG. 11. FIG. 11 is a schematic diagram illustrating the configuration of a wide-angle projection optical system according to another embodiment of the present invention. As shown in FIG. 11, an object surface 3 is configured as an object side A for the image projected by the wide-angle projection optical system 4 of the present invention to be formed on. In this embodiment, the wide-angle projection optical system 4 includes, sequentially arranged from the object side A to an image side B, a first optical system 41 and a second optical system 42, and the first optical system 41 and the second optical system 42 are configured to form the wide-angle projection optical system 4 as a telecentric wide-angle projection optical system. The first optical system 41 includes a first lens group 411 having positive power and including a aperture stop 412 and a second lens group 413 having positive power, and the second optical system 42 includes a refracting and reflecting mirror 421. The first lens group 411, the aperture stop 412, the second lens group 413 and the refracting and reflecting mirror 421 are similar with the first lens group 211, the aperture stop 212, the second lens group 213 and the Mangin mirror 221 of the above-mentioned embodiment, and not redundantly described herein. It should be noted that the wide-angle projection optical system of the present invention can be a non-telecentric wide-angle projection optical system or a telecentric wide-angle projection optical system for being utilized in digital light processing (DLP) device or liquid crystal displaying (LCD) device.

Table 3 shows the prescription data of the lenses according to this embodiment. In Table 3, "No." is a surface number from the object side to the image side. "R" indicates radius of curvature, "T" indicates the thickness, "Nd" indicates a refractive index, and "Vd" indicates an Abbe number. The front and rear surfaces of the lenses No. 18, No. 19, No. 24, No. 25, No. 26, NO. 27 and No. 28 are all aspheric. The aspheric coefficients (k, A4, A6, A8, A10 and A12) of these surfaces are listed in Table 4. As a consequence, wide-angle projection optical system 2 of the present invention can achieve a full field angle larger than ±70 degrees. In this embodiment the micro-display is illuminated by a telecentric illumination system. This means that the central rays from each filed on the micro-display are essentially collimated from the micro-display.

TABLE 3

| No. | R | T | Nd | Vd |
|---|---|---|---|---|
| 0 | Infinity | 0.7 | | |
| 1 | Infinity | 1.050 | 1.51 | 63.0 |
| 2 | Infinity | 1 | | |
| 3 | Infinity | 18 | 1.52 | 64.1 |
| 4 | Infinity | 5 | | |
| 5 | 48.9351 | 5.448 | 1.50 | 81.5 |
| 6 | −69.6432 | 0.128 | | |
| 7 | 350.5973 | 3.62 | 1.49 | 70.2 |
| 8 | −60.8138 | 0.15 | | |
| 9 | 53.6141 | 4.219 | 1.50 | 81.5 |
| 10 | −91.3327 | 1.86 | | |
| 11 | 85.8327 | 11.213 | 1.75 | 35.3 |
| 12 | 75.3116 | 3.026 | | |
| 13 | −20.8099 | 2.834 | 1.69 | 31.1 |
| 14 | 18.2072 | 4.347 | 1.50 | 81.5 |
| 15 | −33.3142 | 1.848 | | |
| 16 | 36.1211 | 11.073 | 1.60 | 39.2 |
| 17 | −37.1867 | 20.315 | | |
| 18 | 49.3392 | 5.21 | 1.53 | 56.0 |
| 19 | −5321.1473 | 0.196 | | |
| 20 | 69.0805 | 5.819 | 1.76 | 27.5 |
| 21 | −337.8203 | 3.626 | | |
| 22 | −32.3685 | 11 | 1.62 | 60.3 |
| 23 | 743.4352 | 1.637 | | |
| 24 | −43.9674 | 5.485 | 1.53 | 56.0 |
| 25 | 34.7057 | 102.68 | | |
| 26 | −82.1935 | 6.244 | 1.53 | 56.0 |
| 27 | −62.4958 | −6.244 | −1 | 0 |
| 28 | −82.1935 | −625.847 | | |
| 29 | Infinity | | | |

TABLE 4

| No. | k | A4 | A6 | A8 | A10 | A12 |
|---|---|---|---|---|---|---|
| 18 | 0.0352 | −7.1386e−6 | −8.1380e−9 | −5.3639e−11 | −3.4127e−13 | −5.6496e−16 |
| 19 | −932.1597 | 1.2229e−6 | 5.0426e−9 | −7.9514e−11 | −3.0201e−13 | 2.9009e−16 |
| 24 | −11.1474 | 1.0568e−5 | 1.6169e−8 | 3.9028e−11 | −8.8211e−14 | 1.9858e−17 |
| 25 | −4.7449 | −2.0330e−6 | 6.3947e−9 | 5.6832e−12 | 4.6915e−15 | 1.0894e−17 |
| 26 | −1.9369 | −8.7074e−7 | 2.3081e−11 | 9.7287e−15 | 1.0514e−18 | 2.0919e−23 |
| 27 | −2.8101 | −8.5863e−7 | 5.3320e−11 | −7.9959e−16 | −3.2209e−19 | 5.7242e−24 |
| 28 | −1.9369 | −8.5863e−7 | 5.3320e−11 | −7.9959e−16 | −3.2209e−19 | 5.7242e−24 |

Figure 12:
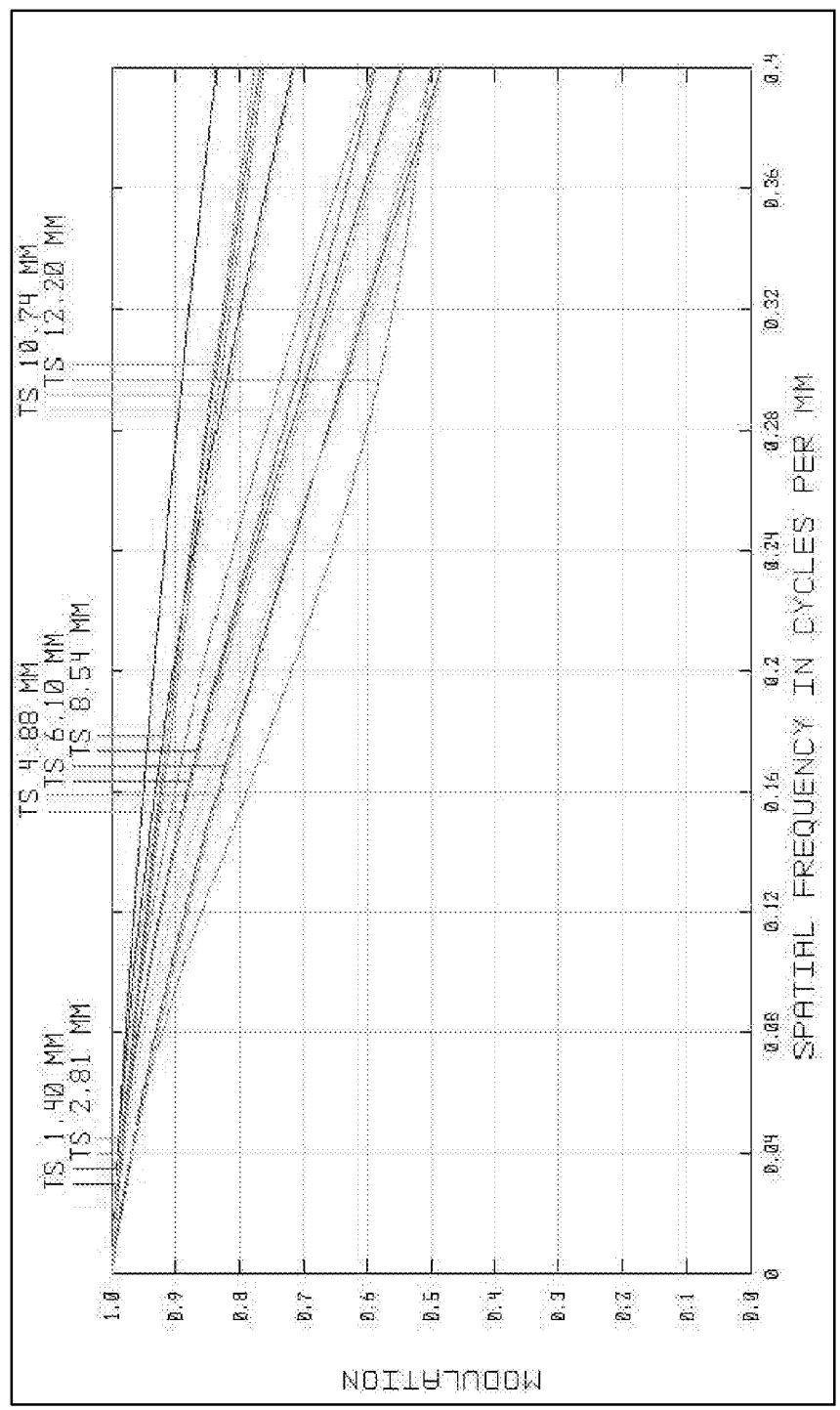
FIG. 12 is a schematic diagram illustrating modulation transfer function (MTF) characteristics in the image side by the wide-angle projection optical system according to the embodiment of the present invention with the values shown in Table 3.
Figure 13B:
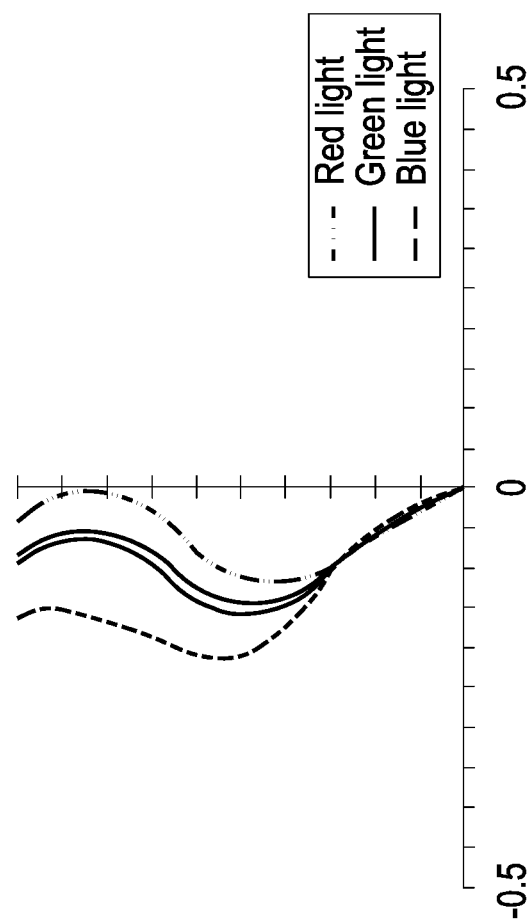
FIG. 13B is a schematic diagram illustrating distortion curve in the image side by the wide-angle projection optical system according to the embodiment of the present invention with the values shown in Table 3.
Figure 14:
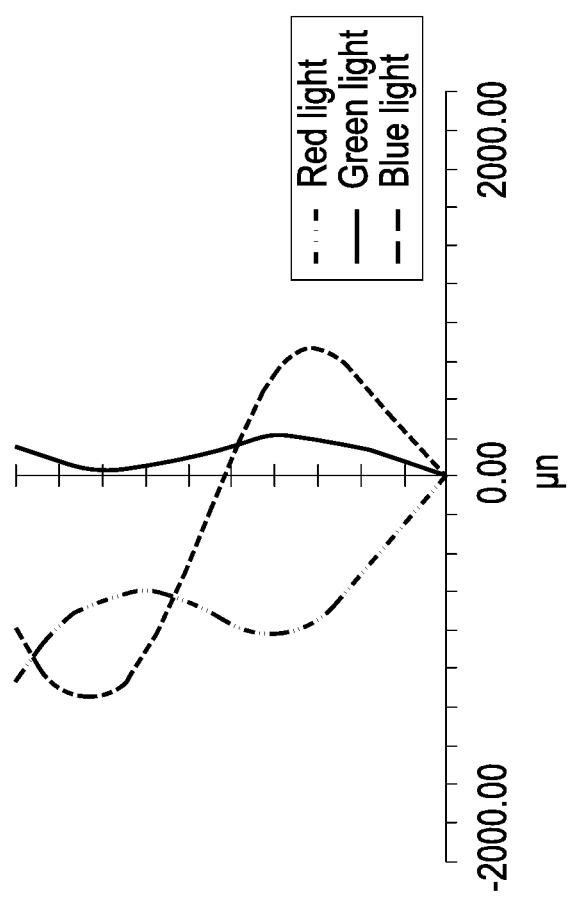
FIG. 14 is a schematic diagram illustrating lateral color in the image side by the wide-angle projection optical system according to the embodiment of the present invention with the values shown in Table 3.

FIG. 12 is a schematic diagram illustrating modulation transfer function (MTF) characteristics in the image side by the wide-angle projection optical system according to the embodiment of the present invention with the values shown in Table 3. The horizontal axis indicates spatial frequency (cycles/mm) and the vertical axis of ordinates indicates modulation values. The spatial frequency indicates the number of sine waves per millimeter. The maximum value 1 in the vertical axis indicates that the MTF is 100%. As shown in FIG. 4, in the Nyquist Frequency, the MTF is still greater than 50%, which means the MTF ratio does not obviously decrease, so that every pixel is clearly resolved in achieving high quality image. FIG. 13A is a schematic diagram illustrating grid distortion in the image side by the wide-angle projection optical system according to the embodiment of the present invention with the values shown in Table 3. FIG. 13B is a schematic diagram illustrating distortion curve in the image side by the wide-angle projection optical system according to the embodiment of the present invention with the values shown in Table 3. As shown in FIG. 5A and FIG. 5B, the grid distortion or image distortion can be effectively corrected in the projection areas of the embodiment. FIG. 14 is a schematic diagram illustrating lateral color in the image side by the wide-angle projection optical system according to the embodiment of the present invention with the values shown in Table 3. As shown in FIG. 6, the difference of the lateral colors is less than a pixel, so that the color dislocation issue is avoided when projecting color lights, which means the chromatic aberration is also effectively corrected by the present invention. From the above drawings, the wide-angle projection optical system 2 of the present invention has a large full field angle, low image aberration or distortion, good optical characteristics and high image quality. A projection with high image quality and low image distortion is implemented by the embodiments mentioned above without any non-axially symmetric optical component.

From the above description, the wide-angle projection optical system with ultra-short-throw of the present invention is capable of providing a large full field angle. The wide-angle projection optical system comprises a first lens group with positive power, a second lens group with positive power, and a Mangin mirror having a refracting surface and a reflecting surface. The wide-angle projection optical system may provide a full field angle larger than ±70 degrees, a very short effective focal length, low image distortion and high image quality. The use of the wide-angle projection optical system makes the compact and thin display system possible. Moreover, by means of the wide-angle projection optical system, the projection display apparatus may be installed over the white board or the display screen.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A wide-angle projection optical system between an object side and an image side thereof comprising:
   a first optical system comprising:
      a first lens group having positive power and comprising an aperture stop proximal to the image side, wherein light is converged toward the aperture stop; and
      a second lens group having positive power, wherein the second lens group is disposed on the image side of the aperture stop; and
   a second optical system comprising:
      a Mangin mirror disposed on the image side of the first lens group and the second lens group, wherein the first lens group and the second lens group are configured to form an aberrated real image in front of the Mangin mirror, and wherein the Mangin mirror includes a refracting surface and a reflecting surface for refracting the light two times and reflecting the light one time, thereby producing an enlarged real image on a screen; and
      a glass plate disposed between the second lens group and the Mangin mirror, wherein the glass plate comprises a black aperture disposed on the glass plate for filtering the lights reflected by the refracting surface,
      wherein the first lens group, the second lens group and the Mangin mirror have a common optical axis.

2. The wide-angle projection optical system according to claim 1, wherein the glass plate is disposed at a location where the lights reflected by the reflecting surface are most concentrated.

3. The wide-angle projection optical system according to claim 1, wherein the radius of curvature of the refracting surface and the radius of curvature of the reflecting surface are different.

4. The wide-angle projection optical system according to claim 3, wherein the ratio of the absolute value of the radius of curvature of the refracting surface minus the radius of curvature of the reflecting surface to the absolute value of the radius of curvature of the refracting surface plus the radius of curvature of the reflecting surface is greater than 0.12.

5. The wide-angle projection optical system according to claim 1, wherein the Mangin mirror is a concave Mangin mirror having positive power.

6. The wide-angle projection optical system according to claim 5, wherein the center of curvature of the Mangin mirror is disposed between the object side and the image side.

7. The wide-angle projection optical system according to claim 5, wherein the Mangin mirror is concave toward the object side.

8. The wide-angle projection optical system according to claim 1, wherein the light is transmitted through the refracting surface of the Mangin mirror, reflected by the reflecting surface, and further transmitted through the refracting surface in a reverse direction.

9. The wide-angle projection optical system according to claim 1, wherein each lens of the first lens group is axially symmetric and is either a spherical lens or an aspheric lens.

10. The wide-angle projection optical system according to claim 1, wherein both surfaces of at least one lens of the second lens group are aspheric.

11. The wide-angle projection optical system according to claim 10, wherein each lens of the second lens group is axially symmetric.

12. The wide-angle projection optical system according to claim 1, wherein the first optical system and the second optical system are configured to form the wide-angle projection optical system as a telecentric wide-angle projection optical system.

13. The wide-angle projection optical system according to claim 1, wherein the first optical system and the second optical system are configured to form the wide-angle projection optical system as a non-telecentric wide-angle projection optical system.

14. A wide-angle projection optical system, from an object side to an image side, the wide-angle projection optical system comprising:
   a first optical system comprising:
      a first lens group having positive power and comprising an aperture stop located proximal to the image side, wherein light is converged toward the aperture stop; and
      a second lens group having positive power, wherein the second lens group is disposed on the image side of the aperture stop, and both surfaces of at least one lens of the second lens group are aspheric; and
   a second optical system comprising:
      a refracting and reflecting mirror with positive power, wherein the first lens group and the second lens group are configured to form an aberrated real image in front of the refracting and reflecting mirror with positive power, and wherein the refracting and reflecting mirror includes a refracting surface and a reflecting surface for refracting the light two times and reflecting the light one time, thereby producing an enlarged real image on a screen; and a glass plate disposed between the second lens group and the refracting and reflecting mirror, wherein the glass plate comprises a black aperture disposed on the glass plate for filtering the lights reflected by the refracting surface;

wherein the first lens group, the second lens group and the refracting and reflecting mirror have a common optical axis.

15. The wide-angle projection optical system according to claim 14, wherein the glass plate is disposed at a location where the lights reflected by the reflecting surface are most concentrated.

16. The wide-angle projection optical system according to claim 14, wherein the radius of curvature of the refracting surface and the radius of curvature of the reflecting surface are different.

17. The wide-angle projection optical system according to claim 16, wherein the ratio of the absolute value of the radius of curvature of the refracting surface minus the radius of curvature of the reflecting surface to the absolute value of the radius of curvature of the refracting surface plus the radius of curvature of the reflecting surface is greater than 0.12.

* * * * *